US008714180B2

(12) United States Patent
Klug et al.

(10) Patent No.: US 8,714,180 B2
(45) Date of Patent: May 6, 2014

(54) THERMAL TRIGGERING ELEMENT FOR SPRINKLERS, VALVES OR THE LIKE

(75) Inventors: Rüdiger Klug, Ahrensburg (DE); Tino Schmalfuss, Hamburg (DE)

(73) Assignee: Job Lizenz GmbH & Co. KG, Ahrensburg (DE)

( * ) Notice: Subject to any disclaimer, the term of this patent is extended or adjusted under 35 U.S.C. 154(b) by 32 days.

(21) Appl. No.: 13/494,368

(22) Filed: Jun. 12, 2012

(65) Prior Publication Data

US 2013/0008521 A1 Jan. 10, 2013

(30) Foreign Application Priority Data

Jul. 7, 2011 (DE) ..................... 20 2011 050 661 U

(51) Int. Cl.
*F16K 17/14* (2006.01)

(52) U.S. Cl.
USPC ................... 137/72; 137/67; 137/75; 137/79; 137/910; 169/38

(58) Field of Classification Search
USPC ..................... 137/67, 72, 75, 79, 910; 169/38
See application file for complete search history.

(56) References Cited

U.S. PATENT DOCUMENTS

| | | | | | |
|---|---|---|---|---|---|
| 1,905,676 | A * | 4/1933 | Barclay | 169/38 |
| 3,548,949 | A | 12/1970 | Groves et al. | |
| 4,099,574 | A | 7/1978 | Cooper et al. | |
| 4,938,294 | A * | 7/1990 | Mohler et al. | 169/38 |
| 4,981,179 | A * | 1/1991 | Klein | 169/38 |
| 4,993,496 | A * | 2/1991 | Riedle et al. | 169/38 |
| 5,967,238 | A * | 10/1999 | Pepi et al. | 169/37 |
| 7,096,964 | B2 * | 8/2006 | Dushkin et al. | 169/37 |
| 8,402,985 | B2 * | 3/2013 | Schmalfuss | 137/72 |
| 2004/0074650 | A1 | 4/2004 | Shiga | |
| 2009/0092519 | A1 * | 4/2009 | Stewart et al. | 422/82.12 |
| 2010/0307605 | A1 * | 12/2010 | Schmalfuss | 137/72 |

FOREIGN PATENT DOCUMENTS

| | | |
|---|---|---|
| DE | 4416746 | 11/1995 |
| DE | 19780041 | 2/2002 |
| DE | 202009007987 | 10/2010 |

OTHER PUBLICATIONS

Document 1, Chembook, CAS DataBase List, CAS No. 4795-29-3, http://www.chembook.com, copyright 2010.*
Document 2, Chembook, CAS DataBase List , CAS No. 90-02-8, http://www.chembook.com, copyright 2010.*

* cited by examiner

*Primary Examiner* — John K Fristoe, Jr.
*Assistant Examiner* — Minh Le
(74) *Attorney, Agent, or Firm* — Sand & Sebolt

(57) ABSTRACT

A thermal triggering element for sprinklers, valves or the like including an enclosed compartment with a container filled with a highly temperature-sensitive shattering fluid for precise and reproducible adjustment of a triggering temperature within the range of a few degrees Celsius. The invention increases the accuracy of the triggering temperature and identifies shattering liquids that allow precise sensitive triggering action in terms of temperature of the triggering element and open up further triggering temperatures ranges. The triggering fluid contains or consists of a hydrocarbon compound selected among one of the following substance groups or a mixture thereof:

d) a heterocyclic hydrocarbon having a OH, NH or $NH_2$ group bonded to a carbon atom;
e) a hydrocarbon having at least one benzene ring with an OH group bonded to one of the carbon atoms of the benzene ring;
f) a phosphate with at least one hydrocarbon moiety.

15 Claims, 1 Drawing Sheet

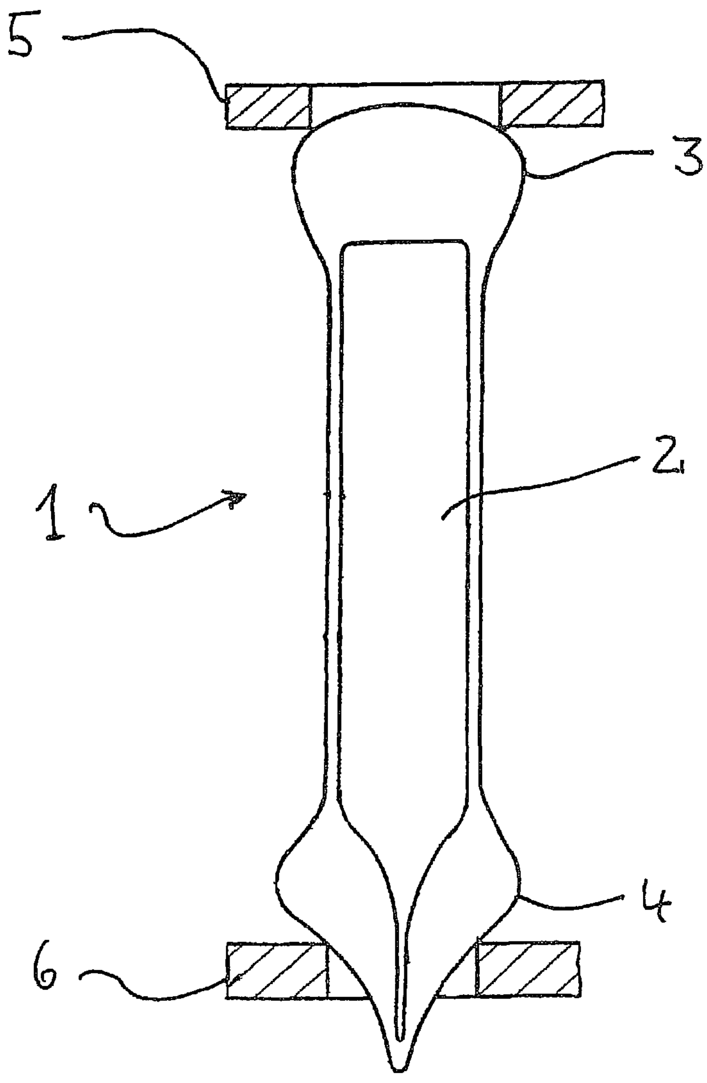
5
3
2
1
4
6

THERMAL TRIGGERING ELEMENT FOR SPRINKLERS, VALVES OR THE LIKE

CROSS-REFERENCE TO RELATED APPLICATIONS

This application claims priority from German patent application Serial No. 202011050661.4, filed Jul. 7, 2011, the entire specification of which is incorporated herein by reference.

BACKGROUND OF THE INVENTION

1. Technical Field

The invention relates to a thermal triggering element for sprinklers, valves or anything similar in the form of a completely enclosed compartment with a container that is filled with a shattering fluid.

2. Background Information

Thermal triggering elements for sprinklers as well as for other valves, such as, for example, emergency release valves of gas containers, that are configured having containers with a hollow space on the inside, completely enclosed and filled with a shattering fluid, have been known and taught by the prior art for quite some time. The containers therein are in most instances made of glass; they can also be referred to as glass bulbs.

Such glass bulbs that are used as a thermal triggering element are specified, for example, in DE 36 01 203 A1.

Triggering elements of this kind are filled with a shattering fluid that expands upon its being heated resulting in the shattering of the container that is typically loaded in a valve seat and holds the valve in its closed position, thus resulting in the triggering action of a valve or the like.

Different materials have been proposed as shattering fluids. U.S. Pat. No. 4,938,294, for example, discloses toluene, xylene, trichloroethylene, tetrachloroethylene and/or mixtures thereof as expedient shattering fluids. EP 0 838 242 B1 discloses a halogen derivative of an aromatic hydrocarbon having two or more halogen substituents, an aliphatic amide as well as mixtures thereof as expedient shattering fluids.

DE 197 80 041 C1 specifies a substance that is derived from a halogen-free or a halogenated hydrocarbon as expedient shattering fluid having as part of its structural formula a)
  - i) at least one $CH_2$ group substituted by oxygen (O), sulfur (S), sulfinyl (SO) or sulfonyl ($SO_2$); or having
  - ii) at least one CH group substituted by nitrogen;

b) no hydrogen atoms that are directly bonded to oxygen, nitrogen of sulfur;

c)
  - i) at least one ring; or
  - ii) at least two oxygen atoms with two single bonds, respectively; or
  - iii) at least two carbonyl groups of ketones and/or aldehydes; or
  - iv) at least one oxidized sulfur atom (SO or $SO_2$); or
  - v) at least one nitrogen atom in form of an amide, imide, imine or nitrile.

DE 20 2009 007 987 U1, finally, proposes as a shattering fluid hydrocarbons or a mixture of hydrocarbons of the group below:

a) an aliphatic bromide;

b) a hydrocarbon with a nitro group;

c) a single-halogenated benzene ring;

d) an aliphatic ester compound having two double-bonded oxygen atoms, respectively.

Although all the aforementioned triggering fluids have proven effective, in principle, and they are basically expedient options for use in triggering elements according to the class, nevertheless, there exists a continuing demand for improvement, in particular in view of the aspects as indicated below:

BRIEF SUMMARY OF THE INVENTION

For example, the requirements placed upon modem triggering elements have become more sophisticated in terms of accuracy of the trigger temperature; this means, there is a demand for highly temperature-sensitive shattering fluids that are suitable for a precise and reproducible adjustment of a triggering temperature within a range of only a few degrees Celsius. The spectrum of the adjustable triggering temperatures is to be extended therein by selecting an expedient shattering fluid.

Therefore, the invention seeks to provide further shattering fluids that allow, on the one hand, for triggering action of the triggering element provided therewith that is highly precise and sensitive in terms of temperature while, on the other hand, opening up further ranges for triggering temperatures.

While searching for possible alternate options, the inventors conducted comprehensive experiments and studies, finally arriving at the following groups of hydrocarbon compounds:

a) a heterocyclic hydrocarbon having an OH, NH or $NH_2$ group bonded to a carbon atom;

b) a hydrocarbon having at least one benzene ring with an OH group bonded to one of the carbon atoms of the benzene ring;

c) a phosphate with at least one hydrocarbon moiety.

Individual substances, as well as mixtures thereof, can be selected from these groups and used in order to process them into a triggering fluid.

The groups therein comprise heterocyclic hydrocarbons having an OH, NH or $NH_2$ group that is bonded to a carbon atom, hydrocarbons having at least one benzene ring with an OH group that is bonded to a carbon atom of the benzene ring and phosphates with at least one hydrocarbon moiety.

Heterocyclic hydrocarbons with an OH, NH or $NH_2$ group that is bonded to a carbon atom are characterized by their very narrow triggering temperature range in that they have a very high coefficient of expansion accompanied by, simultaneously, low compressibility.

Hydrocarbons that have at least one benzene ring with an OH group that is bonded to a carbon atom of the benzene ring also have a high coefficient of expansion and/or low compressibilities, which results in a narrow trigger temperature range. Moreover, these substances have the advantage of fast triggering times.

Phosphates with at least one hydrocarbon moiety are especially well suited for use in high temperature ranges because they have a high boiling point, which is where they have in terms of their triggering behavior (triggering temperature range, triggering speed) clear advantages in contrast to the known triggering fluids that are available for use in this range.

In particular, heterocyclic hydrocarbons with an OH, NH or $NH_2$ group that is bonded to the carbon atom can be those in which one heteroatom in the ring is an oxygen atom. Moreover, such a form of said molecule is advantageous in which the OH, NH or $NH_2$ group is bonded to a carbon atom with the same being bonded to a moiety that is bonded to the ring.

When selecting a first alternative substance comprising a hydrocarbon having at least one benzene ring with an OH group bonded to one of the carbon atoms of the benzene ring, it is advantageous for the benzene ring to have, additionally, aside from the OH group that is bonded to one of the carbon atoms thereof, a further at least one carbon atom with a double-bonded moiety having an oxygen atom bonded thereto.

If a substance according to a second alternate option is selected, meaning a phosphate with hydrocarbon moiety, it is advantageous for the hydrocarbon moiety to be a methyl, ethyl or butyl moiety. In particular, the phosphate can have three hydrocarbon moieties, preferably three same such moieties.

By selecting mixtures of substances from the named substance groups, it is possible to thus exercise control over, meaning designing, the triggering properties of the thermal triggering elements.

Additives can be advantageously added to the shattering fluid, in particular, one or several colorant(s). Since most of the selected triggering fluids are colorless-transparent, adding a colorant not only facilities quality control tasks such as, for example, recognizing a gas bubble that was intentionally left inside the interior compartment and an assessment of the size of the same; more than that, adding different colorants can be used to represent a coding for different triggering temperatures, which is already known from the prior art,

BRIEF DESCRIPTION OF THE SEVERAL VIEWS OF THE DRAWINGS

FIG. 1 shows a triggering element in accordance with the present invention.

DETAILED DESCRIPTION OF THE INVENTION

Further advantages and characteristics of the invention result from the following description of an embodiment; we refer herein to the single enclosed FIG. 1 that indicates, schematically clamped between two support elements, a triggering element that is filled in the manner according to the invention with a specified and claimed shattering fluid.

The triggering element as shown in FIG. 1 is a glass bulb 1, as basically known from the prior art. Correspondingly, the presently depicted glass bulb corresponds in terms of its design essentially to the form and configuration according to the teaching as set forth in DE 36 01 203. The glass bulb completely encloses a hollow compartment 2 and rests, in terms of its use as a triggering element, by its two ends 3 and 4 that are opposite each other against support elements 5 and 6, and it is clamped there-between. One of the support elements therein, for example support element 5, can be a valve disc of a sprinkler while the other support element, for example support element 6, can be a support stirrup located across from the same, as is found frequently in sprinkler means. Similarly, however, the glass bulb 1 can also be incorporated as a thermal triggering element in an emergency release valve of a gas container or similar devices.

The essential aspect of the invention is the shattering fluid that is filled in the compartment 2 which results, upon its being heated and due to the thermal expansion, in a shattering of the glass bulb 1 and, therefore, a triggering action of the thermal triggering device. Typically, and this aspect is also known from the prior art, the triggering fluid is filled into the compartment leaving a defined gas bubble (usually air), and wherein the gas bubble absorbs the first thermal expansion of the triggering fluid until, in particular due to a phase transition, an explosive-type expansion occurs that causes the glass bulb 1 to shatter. According to the invention, the triggering fluid in compartment 2 contains at least one hydrocarbon compound from the group of a heterocyclic hydrocarbon having an OH, NH or $NH_2$ group bonded to a carbon atom, a hydrocarbon having at least one benzene ring with an OH group that is bonded to a carbon atom of the benzene ring and a phosphate with at least one hydrocarbon moiety and/or a mixture of different hydrocarbon compounds from one or several of these categories. The shattering fluid can contain these hydrocarbon compounds only as one component but consists, in particular, completely of one or several of the named hydrocarbons.

Examples of expedient hydrocarbon compounds used according to the invention for the shattering fluid are taken from these groups as seen in the table below:

| Substance Group | Examples | |
|---|---|---|
| Heterocyclic hydrocarbons with an OH, NH or $NH_2$ group bonded to a carbon atom | 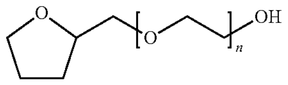 Tetrahydrofurfuryl alcohol polyethylene glycolether | 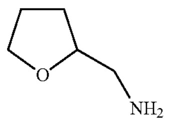 2-Tetrahydrofurfuryl amine |
| Hydrocarbons having a benzene ring with an OH group bonded to a carbon atom of the benzene ring | 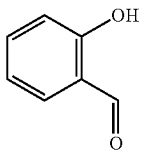 Salicylaldehyde | 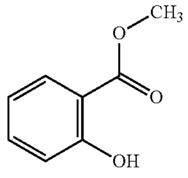 Methyl salicylate |

-continued

| Substance Group | Examples |
| --- | --- |
| Phosphates with at least one hydrocarbon moiety | 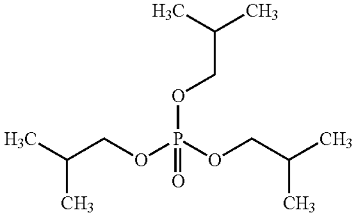 [SMILES: CC(C)COP(=O)(OCC(C)C)OCC(C)C] Triisobutyl phosphate 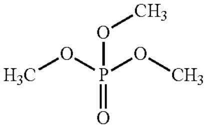 Trimethyl phosphate |

Selecting a corresponding trigger fluid is associated with considerable advantages in relation to the prior art; in particular, including the advantage of precise adjustability of a triggering temperature that is selectable over an extended temperature range, specifically in narrowly adjustable temperature windows, for the triggering action as well as increased responsiveness.

Correspondingly, a tetrahydrofurfuryl alcohol polyethylene glycolether as shown at the uppermost end of the column of the above table as well as a 2-tetrahydrofurfuryl amine shown therein demonstrate the advantage that, when they are used as triggering fluid, due to their high coefficients of expansion and low compressibilities, they result in a very narrow temperature range for the triggering temperature.

The substances represented in the second group (middle row of the column), which are salicylaldehyde and methyl salicylate, are also characterized by their high coefficients of expansion and/or low compressibilities, which again results in a narrow temperature range for the triggering temperature of a thermal triggering element that is armed with this fluid as triggering fluid. Furthermore, when used as triggering fluid, these substances result in fast triggering times.

Triisobutyl phosphate and trimethyl phosphate, which are found in the table at the bottom end of the column, are examples of a further substance group, having high boiling points and are, therefore, especially well suited for use as triggering fluids in thermal triggering elements for high triggering temperatures and/or triggering temperature ranges. In contrast to the known, conventional triggering fluids, they have clear advantages in terms of their triggering behavior, such as triggering speed and low expansion of the triggering window.

Additives can therein be added to the shattering fluid; in particular, one or several colorant(s). Since most of the selected triggering fluids are colorless-transparent, adding a colorant not only facilitates the recognition of the desired gas bubble in the quality control stage and the estimation of the size of the same, adding different colorants also allows for indicating a coding of different triggering temperatures, which is known from the prior art and already in use.

Thus, the present invention relates to a thermal triggering element for sprinklers, valves or the like in form of a completely enclosed compartment with a container that is filled with a shattering fluid.

Since the requirements placed upon modem triggering elements have become more sophisticated in terms of the precision of the triggering temperature, there exists a demand for highly temperature-sensitive shattering fluids that are suitable for a precise and reproducible adjustment of a triggering temperature within the range of a few degrees Celsius. The spectrum of adjustable triggering temperatures is to be extended therein by the selection of an expedient shattering fluid.

The invention is intended to increase the accuracy of the triggering temperature and identify further shattering liquids that allow, on the one hand, a highly precise and sensitive triggering action in terms of temperature of the triggering element that is armed therewith and, on the other hand, open up further triggering temperatures ranges.

This object is achieved in that the triggering fluid contains a hydrocarbon compound selected among one of the following substance groups or a mixture thereof or in that the triggering fluid consists of such a hydrocarbon compound or a mixture thereof:

a) a heterocyclic hydrocarbon having a OH, NH or $NH_2$ group bonded to a carbon atom;
b) a hydrocarbon having at least one benzene ring with an OH group bonded to one of the carbon atoms of the benzene ring;
c) a phosphate with at least one hydrocarbon moiety.

LIST OF REFERENCE SIGNS

1 Glass bulb
2 Compartment
3 End
4 End
5 Support element
6 Support element

The invention claimed is:

1. A thermal triggering element for sprinklers and valves in the form of a completely enclosed compartment with a container filled with a shattering fluid, and wherein the shattering fluid contains a hydrocarbon compound of one of the following substance groups or a mixture thereof or the shattering fluid comprises one of the following hydrocarbon compounds or a mixture thereof:

a) a heterocyclic hydrocarbon having an OH, NH or $NH_2$ group bonded to a carbon atom;
b) a hydrocarbon having at least one benzene ring with an OH group bonded to one of the carbon atoms of the benzene ring;
c) a phosphate with at least one hydrocarbon moiety.

2. The thermal triggering element according to claim 1 wherein the shattering fluid is a heterocyclic hydrocarbon with an OH, NH or $NH_2$ group bonded to a carbon atom or contains such in which an oxygen atom is one of the heterocyclic atoms of heterocyclic ring.

3. The thermal triggering element according to claim 1 wherein the shattering fluid is a heterocyclic hydrocarbon with an OH, NH or $NH_2$ group bonded to a carbon atom of a moiety that is bonded to heterocyclic ring or contains such.

4. A thermal triggering element for sprinklers and valves in the form of a completely enclosed compartment with a container filled with a shattering fluid, and wherein the shattering fluid contains a hydrocarbon compound of one of the following substance groups or a mixture thereof or the shattering fluid comprises one of the following hydrocarbon compounds or a mixture thereof:

a) a heterocyclic hydrocarbon having an OH, NH or $NH_2$ group bonded to a carbon atom;

b) a hydrocarbon having at least one benzene ring with an OH group bonded to one of the carbon atoms of the benzene ring;

c) a phosphate with at least one hydrocarbon moiety; and wherein the shattering fluid is a hydrocarbon having at least one benzene ring having an OH group bonded to a carbon atom of the benzene ring and a further moiety having at least one carbon moiety with a double-bonded oxygen atom bonded thereto or contains such.

5. A thermal triggering element for sprinklers and valves in the form of a completely enclosed compartment with a container filled with a shattering fluid, and wherein the shattering fluid contains a hydrocarbon compound of one of the following substance groups or a mixture thereof or the shattering fluid comprises one of the following hydrocarbon compounds or a mixture thereof:

a) a heterocyclic hydrocarbon having an OH, NH or $NH_2$ group bonded to a carbon atom;

b) a hydrocarbon having at least one benzene ring with an OH group bonded to one of the carbon atoms of the benzene ring;

c) a phosphate with at least one hydrocarbon moiety; and wherein the shattering fluid is a phosphate having at least one hydrocarbon moiety in form of a methyl, ethyl or butyl group or contains such.

6. A thermal triggering element for sprinklers and valves in the form of a completely enclosed compartment with a container filled with a shattering fluid, and wherein the shattering fluid contains a hydrocarbon compound of one of the following substance groups or a mixture thereof or the shattering fluid comprises one of the following hydrocarbon compounds or a mixture thereof:

a) a heterocyclic hydrocarbon having an OH, NH or $NH_2$ group bonded to a carbon atom;

b) a hydrocarbon having at least one benzene ring with an OH group bonded to one of the carbon atoms of the benzene ring;

c) a phosphate with at least one hydrocarbon moiety; and wherein the shattering fluid is a phosphate with three hydrocarbon moieties or contains such.

7. The thermal triggering element according to claim 1 wherein the shattering fluid contains additives.

8. The thermal triggering element according to claim 7, wherein the additives comprise one or several colorants.

9. The thermal triggering element according to claim 4, wherein the shattering fluid contains additives.

10. The thermal triggering element according to claim 9, wherein the additives comprise one or several colorants.

11. The thermal triggering element according to claim 5, wherein the shattering fluid contains additives.

12. The thermal triggering element according to claim 11, wherein the additives comprise one or several colorants.

13. The thermal triggering element according to claim 6, wherein the shattering fluid contains additives.

14. The thermal triggering element according to claim 13, wherein the additives comprise one or several colorants.

15. A thermal triggering element for sprinklers and valves in the form of a completely enclosed compartment with a container filled with a shattering fluid, and wherein the shattering fluid contains a hydrocarbon compound of one of the following substance groups or a mixture thereof or the shattering fluid comprises one of the following hydrocarbon compounds or a mixture thereof:

a) a hydrocarbon having at least one benzene ring with an OH group bonded to one of the carbon atoms of the benzene ring;

b) a phosphate with at least one hydrocarbon moiety.

* * * * *